(12) United States Patent
Miura et al.

(10) Patent No.: US 7,022,301 B2
(45) Date of Patent: Apr. 4, 2006

(54) PROCESS FOR PRODUCING ALUMINUM NITRIDE AND ALUMINUM NITRIDE

(75) Inventors: Hirohisa Miura, Ibaragi (JP); Hirofumi Matunaga, Ibaragi (JP)

(73) Assignee: Ibaragi Laboratory Co., Ltd., Ibaragi (JP)

( * ) Notice: Subject to any disclaimer, the term of this patent is extended or adjusted under 35 U.S.C. 154(b) by 183 days.

(21) Appl. No.: 10/207,961

(22) Filed: Jul. 31, 2002

(65) Prior Publication Data

US 2004/0022715 A1   Feb. 5, 2004

(51) Int. Cl.
*C01B 21/072* (2006.01)

(52) U.S. Cl. ...................................... 423/412
(58) Field of Classification Search ................ 423/412
See application file for complete search history.

(56) References Cited

U.S. PATENT DOCUMENTS

| 4,767,607 A | * | 8/1988 | Schleich ...................... 423/412 |
| 5,126,121 A | * | 6/1992 | Weimer et al. ............. 423/412 |
| 5,219,804 A | * | 6/1993 | Weimer et al. ............. 423/412 |
| 5,837,633 A |   | 11/1998 | Toriyama et al. |
| 6,120,748 A | * | 9/2000 | Kaner et al. ................ 423/412 |
| 6,159,439 A | * | 12/2000 | Miura et al. ................. 423/412 |

FOREIGN PATENT DOCUMENTS

| DE | 36 41 754 A1 | 6/1988 |
| EP | 0 371 771 A2 | 6/1990 |
| FR | 1 162 795 | 9/1958 |
| JP | A 61-83608 | 4/1986 |
| JP | A 62-3007 | 1/1987 |
| JP | A 62-17161 | 1/1987 |
| JP | 63-85007 | * 4/1988 |
| JP | 5-147909 | * 6/1993 |
| JP | 5-294603 | * 11/1993 |
| JP | A 9-12308 | 1/1997 |

OTHER PUBLICATIONS

Chang. An-Jae et al., "Characteristics of aerosol-synthesized AlN particles." Journal of Materials Science. vol. 31, pp. 5701-5708, 1996, no month.

* cited by examiner

Primary Examiner—Wayne A. Langel
(74) Attorney, Agent, or Firm—Oliff & Berridge, PLC

(57) ABSTRACT

A process for producing aluminum nitride includes a nitrogen occluding step and a nitriding step. In the nitrogen occluding step, nitrogen is occluded in an aluminum powder having an average particle diameter of from 10 to 200 μm by holding the aluminum powder in a nitrogen gas atmosphere of 460° C. or more for 10 minutes or more. In the nitriding step, the aluminum powder with nitrogen occluded therein is nitrided by developing a nitriding reaction at a temperature of from 500 to 1,000° C. while holding the aluminum powder in a nitrogen atmosphere whose nitrogen gas pressure falls in a range of from 80 to 300 kpa. Thus, aluminum nitride, in which aluminum is inhibited from remaining and which has small particle diameters, is calcined at a lower temperature and is actively used to make high-quality substrates, can be produced at a lower temperature with a high yield.

10 Claims, 2 Drawing Sheets

Sample No. 1, Magnification ×2,000

Sample No. 1, Magnification ×5,000

PROCESS FOR PRODUCING ALUMINUM NITRIDE AND ALUMINUM NITRIDE

BACKGROUND OF THE INVENTION

1. Field of the Invention

The present invention relates to a process for producing aluminum nitride. Specifically, it relates to a process for producing aluminum nitride in which a nitriding reaction is developed after occluding nitrogen in an aluminum powder.

2. Description of the Related Art

Aluminum nitride (i.e., AlN) is good in terms of characteristics, such as heat resistance, thermal conductivity and electric conductivity, its applicable uses have been expanding. As for the applicable uses of aluminum nitride, it is possible to name containers for high-temperature applications, IC substrates, and so forth.

Industrial aluminum nitride is artificial ceramic which does not exist in nature. It is produced mainly by using two methods, the carbon reduction nitriding method of alumina and the direct nitriding method of aluminum.

(a) Carbon Reduction Nitriding Method of Alumina (i.e., $Al_2O_3 + 3C + N_2 = 2AlN + 3CO$)

The carbon reduction nitriding method of alumina is a production process in which alumina having a high purity is reduced at a high temperature (e.g., from 1,700 to 1,900° C.) by graphite and a nitrogen gas and simultaneously aluminum formed by reducing is nitrided by nitrogen, thereby producing aluminum nitride.

However, it takes a long time for the carbon reduction nitriding method to complete the reaction. Accordingly, the production cost goes up so that a problem arises in that the resulting aluminum nitride is more expensive than the other ceramics, for example, silicon carbide (i.e., SiC), alumina, and so on.

(b) Direct Nitriding Method of Aluminum (i.e., $Al + N_2 = 2AlN$)

The direct nitriding method of aluminum has been used since Briegleb et al. succeeded first in the synthesis in 1862. Since the reaction is an exothermic reaction, the direct nitriding method has an advantage in that it is possible to produce aluminum nitride with ease by simply putting pure aluminum in a nitrogen stream.

However, in the direct nitriding method of aluminum, the supply of nitrogen into aluminum is shut off by a nitrided film when the surface of aluminum is covered with the nitrided film. When the supply of nitrogen is shut off, the nitriding reaction of aluminum is terminated. Accordingly, the direct nitriding method of aluminum has a disadvantage in that it is not possible to obtain aluminum nitride of 100% purity. Consequently, the nitriding is carried out industrially while aluminum is heated to a temperature of from 1,000 to 2,000° C.

Moreover, in the direct nitriding method of aluminum, nitriding and pulverizing the resulting aluminum nitride are carried out repeatedly in order to raise the reaction yield, or an additional treatment, such as adding $AlF_3$ or AlN, is carried out in order to complete the reaction. Accordingly, the direct nitriding method of aluminum requires a step of pulverizing the bulks of aluminum nitride. As a result, the production cost goes up. Hence, the direct nitriding method of aluminum has a problem in that the resulting aluminum nitride is highly expensive.

In addition, the direct nitriding method of aluminum has a problem in that aluminum which is not nitrided remains in the resulting aluminum nitride in a trace amount. When the aluminum resides in the aluminum nitride, the electric characteristics of the aluminum nitride degrade.

In general, aluminum has an oxide film on the surface. Due to the oxide film, the nitriding of aluminum is carried out in a liquid phase region within a temperature range of from 900 to 1,400° C. On the other hand, it is possible to nitride aluminum in a solid phase region within a temperature range of from 520 to 650° C., however, there is a problem in that the nitriding reaction is terminated in the middle so that aluminum nitride of virtually 100% purity cannot be obtained. The problem results from the fact that the nitriding reaction is terminated by an aluminum nitride film which is formed when aluminum is nitrided by 95 to 98.5%.

SUMMARY OF THE INVENTION

The present invention has been developed in view of the above-described circumstances. It is therefore an object of the present invention to provide a process for producing aluminum nitride by which it is possible to produce aluminum nitride less expensively and simultaneously to inhibit not-nitrided aluminum remaining in the resulting aluminum nitride. It is a further object of the present invention to provide noble aluminum nitride.

In order to achieve the aforementioned objects, the inventors of the present invention found out that it is possible to produce aluminum nitride at a lower temperature by arranging the nitriding environment.

Namely, a process for producing aluminum nitride according to the present invention comprises the steps of: occluding nitrogen in an aluminum powder having an average particle diameter of from 10 to 200 µm by holding the aluminum powder in a nitrogen gas atmosphere of 460° C. or more for 10 minutes or more; and nitriding the aluminum powder with nitrogen occluded therein by developing a nitriding reaction at a temperature of from 500 to 1,000° C. while holding the aluminum powder in a nitrogen atmosphere whose nitrogen gas pressure falls in a range of from 80 to 300 kPa.

In accordance with the present process for producing aluminum nitride, nitrogen is occluded in an aluminum powder in the nitrogen occluding step. Accordingly, nitrogen is held in the aluminum powder in such a sufficient amount that aluminum nitride is formed in the subsequent nitriding step. Thus, in the following nitriding step, it is possible to produce aluminum nitride with a high yield without causing aluminum to remain in the resulting aluminum nitride. In accordance with the present aluminum nitride production process, it is possible to carry out nitriding the aluminum nitride powder at a lower temperature. Consequently, it is possible to produce an aluminum nitride powder whose particle diameters are small.

Moreover, aluminum nitride according to the present invention is subjected to the steps of: occluding nitrogen in an aluminum powder having an average particle diameter of from 10 to 200 µm by holding the aluminum powder in a nitrogen gas atmosphere of 460° C. for 10 minutes or more; and nitriding the aluminum powder with nitrogen occluded therein by developing a nitriding reaction at a temperature of from 500 to 1,000° C. while holding the aluminum powder in a nitrogen atmosphere whose nitrogen gas pressure falls in a range of from 80 to 300 kPa.

The present aluminum nitride is subjected to the nitrogen occluding step and the nitriding step. Accordingly, the present aluminum nitride is aluminum nitride in which aluminum is inhibited from remaining. In addition, by lowering the nitriding temperature in the nitriding step, the present aluminum nitride has an advantageous effect in that it makes an aluminum nitride powder whose particle diameters are small.

Hence, the present process for producing aluminum nitride is arranged so that nitrogen is occluded in an aluminum powder in the nitrogen occluding step, thereby holding nitrogen in the aluminum powder in such a sufficient amount that aluminum nitride is formed in the subsequent nitriding step. Thus, in the following nitriding step, it is possible to produce aluminum nitride with a high yield without causing aluminum to remain in the resulting aluminum nitride. Moreover, since the present aluminum nitride production process allows to carry out nitriding the aluminum powder at a lower temperature, it is possible to produce an aluminum nitride powder whose particle diameters are small. In addition, it is possible to calcine the aluminum nitride powder whose particle diameters are small at a lower calcination temperature to make a substrate material. Therefore, it is possible to expect to actively use such an aluminum nitride powder as a raw material for high-quality substrates.

BRIEF DESCRIPTION OF THE DRAWING

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
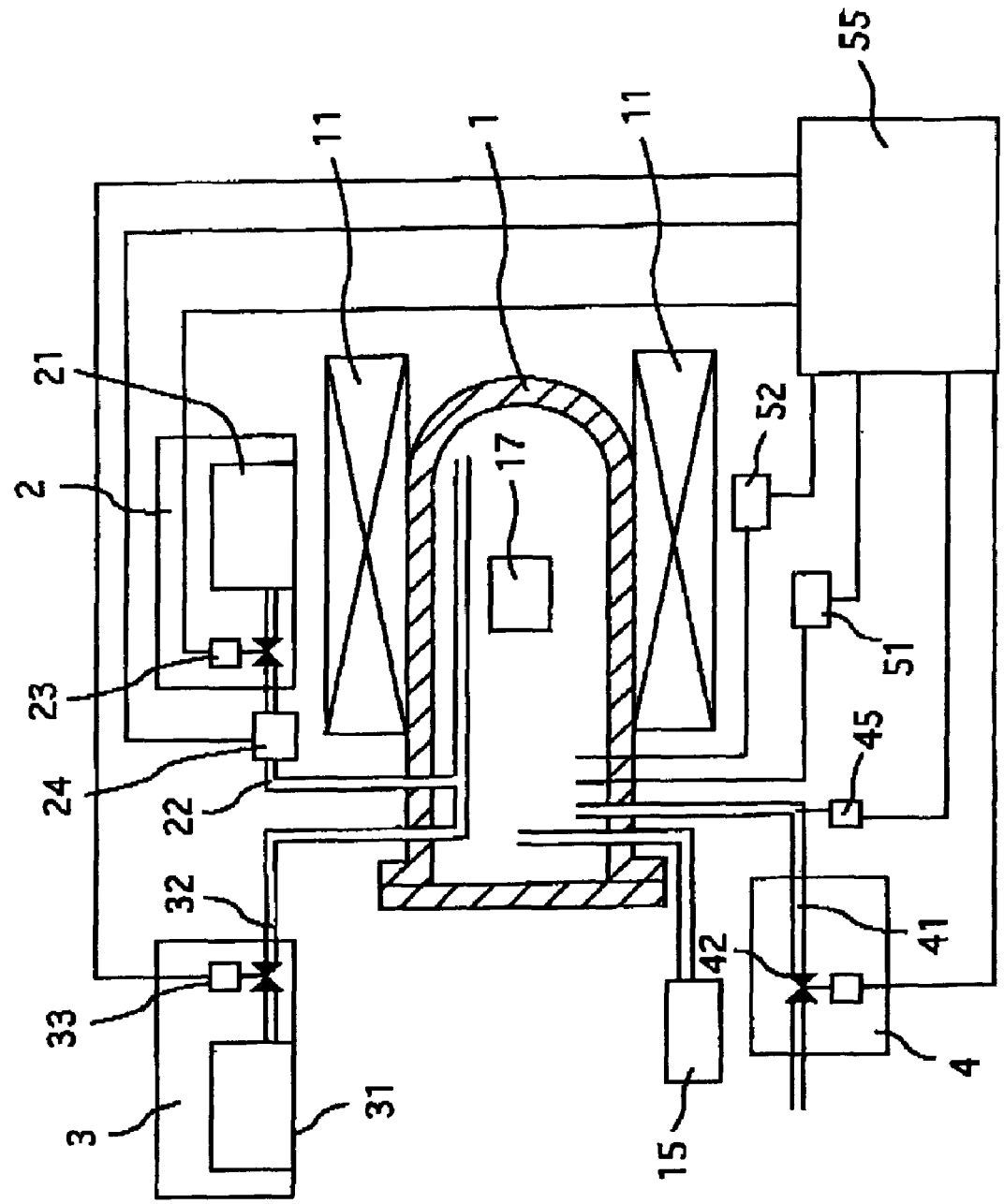
FIG. 1 is a block diagram for illustrating a constitution of a nitriding furnace which was used in examples according the present invention.

Having generally described the present invention, a further understanding can be obtained by reference to the specific preferred embodiments which are provided herein for the purpose of illustration only and not intended to limit the scope of the appended claims.

Process for Producing Aluminum Nitride

A process for producing aluminum nitride according to the present invention comprises a nitrogen occluding step and a nitriding step.

The nitrogen occluding step is a step in which nitrogen is occluded in an aluminum powder having an average particle diameter of from 10 to 200 μm by holding the aluminum powder in a nitrogen gas atmosphere of 460° C. or more for 10 minutes or more. Namely, when nitrogen is occluded in the aluminum powder in the nitrogen occluding step, nitrogen which causes reactions with the aluminum powder in the following nitriding step is disposed adjacent to the aluminum powder. Accordingly, even when rapid reactions occur in the nitriding step, it is possible to suppress nitrogen from being supplied insufficiently.

Since the aluminum powder has an average particle diameter of from 10 to 200 μm, it is possible to produce aluminum nitride in which aluminum is inhibited from remaining. Namely, when the particle diameters of the aluminum powder enlarge, the nitrogen shortage occurs inside the aluminum particles in the nitriding reaction. Consequently, aluminum is likely to remain in the resulting aluminum nitride.

Further, in the present aluminum nitride production process, the aluminum powder which is to be nitrided may have an oxide film on the surface. This is because, in air, aluminum has such a characteristic that it causes reactions with oxygen, included in the air, to form a stable oxide film on the surface.

More specifically, according to experiments, when an aluminum powder is held in a nitrogen gas atmosphere of 520° C., the nitriding reaction is initiated after 3 to 30 hours pass, and is terminated at a nitriding yield of around 92%. The reason for taking such a long time for the nitriding reaction is the oxide film which is formed on the surface of aluminum. Moreover, in ordinary nitriding reactions at lower temperatures, it is not possible to reduce the aluminum oxide with nitrogen at the initial stage of the reactions. Namely, it takes time for nitrogen to gradually intrude into the inside of aluminum. The reactions are initiated rapidly after a certain period of time passes, and are terminated. Consequently, in nitriding treatments at lower temperatures, it is usually difficult to achieve the 100% nitriding.

Furthermore, the aluminum powder which is to be nitride can preferably be mixed with an aluminum nitride powder. Namely, when the aluminum powder which is to be nitrided is mixed with an aluminum nitride powder, it is possible to promote the development of nitriding reactions.

In the nitrogen occluding step, when the aluminum powder is held in a nitrogen gas atmosphere of 460° C. or more for 10 minutes or more, it is possible to occlude nitrogen in the aluminum powder. Note that, when the holding temperature is less than 460° C., or when the holding time is less than 10 minutes, nitrogen is occluded in the aluminum powder insufficiently.

Namely, in the direct nitriding method (i.e., $2Al+N_2=2AlN$) of an aluminum powder by a nitrogen gas, the free energy (i.e., the free energy of Gibbs) of the aluminum nitride formation is always negative. Accordingly, even when the holding temperature is less than 460° C., for example, it is thought that aluminum nitride is formed by holding an aluminum powder at the holding temperature for a long period of time. However, when it takes along time to complete the reactions, the cost required for production goes up. Moreover, in the nitriding reaction, the higher the holding temperature is, the faster the reaction rate of the aluminum powder is Consequently, from the industrial viewpoint, the holding temperature can preferably be a little bit higher, for instance, 500° C. or more. It is further preferred that the holding temperature can desirably be 550° C. or more.

It has not been clear yet on the mechanism how nitrogen is occluded in the aluminum powder. However, it is assumed that nitrogen intrudes into the inside of aluminum along defects or grain boundaries from the surface of aluminum oxide, and that the alumina and nitrogen form conjugate compounds so that nitrogen is occluded inside the aluminum powder.

The nitriding step is a step in which the aluminum powder with nitrogen occluded therein is nitrided by developing a nitriding reaction at a temperature of from 500 to 1,000° C. while holding the aluminum powder in a nitrogen atmosphere whose nitrogen gas pressure falls in a range of from 80 to 300 kPa. Namely, the nitriding step is a step in which the aluminum powder in which nitrogen is occluded in the nitrogen occluding step is held under the predetermined nitrogen gas pressure and at the predetermined heating temperature, thereby developing the nitriding reaction of aluminum. Note that the size of the primary particle diameter of ceramics is determined by the reaction initiation temperature in general. Accordingly, the primary particle diameters of the aluminum nitride particles to be produced are determined by the temperature at which the aluminum powder with nitrogen occluded therein is held in the nitriding step.

When the nitrogen gas pressure is controlled in the range of from 80 to 300 kPa in the nitriding step, a nitrogen gas is supplied to the aluminum powder in an amount sufficient for the nitriding reaction. Namely, when the nitrogen gas pressure is less than 80 kPa, air intrudes from the outside to oxidize the aluminum powder. On the other hand, when the nitrogen gas pressure exceeds 300 kPa, it is not possible to see the rise of the reaction yield in the nitriding reaction, and the cost required for production goes up.

Further, when the temperature of the nitriding reaction is less than 500° C., it takes a long time to carry out the nitriding reaction. When it exceeds 1,000° C., the particle diameters of the resulting aluminum nitride particles enlarge excessively.

In the nitrogen occluding step, the aluminum powder can preferably be held at 460° C. at least for a time period of from 20 to 120 minutes until a nitrogen occlusion reaction is initiated. Namely, in the nitrogen occluding step, when the aluminum powder is held at 460° C. at least for a time period of from 20 to 120 minutes until a nitrogen occlusion reaction is initiated, it is possible for the aluminum powder to occlude nitrogen in an amount sufficient for the nitriding reaction. When the time period is less than 20 minutes until a nitrogen occlusion reaction is initiated, the occlusion of nitrogen is less. Accordingly, it is not possible for the aluminum powder to react with a sufficient amount of nitrogen so that aluminum which is not nitrided remains in the resulting aluminum nitride. On the other hand, when the time period exceeds 120 minutes until a nitrogen occlusion reaction is initiated, the nitrogen occlusion in the aluminum powder is excessive so that it results in wasting the processing time.

In the nitrogen occluding step, the aluminum powder can preferably be heated at a temperature increment rate of 10° C./min. or leas from a temperature of 460° C. or more to a nitriding temperature of the nitriding step. Namely, when the aluminum powder is heated at a temperature increment rate of 10° C./min. or less, it is possible for the aluminum powder to fully occlude nitrogen. On the other hand, when the temperature increment rate exceeds 10° C./min., the aluminum powder occludes nitrogen insufficiently so that aluminum remains in the resulting aluminum nitride.

In the nitrogen occluding step, the aluminum powder can preferably be heated at a temperature increment rate of from 1 to 6° C./min. from a temperature of 460° C. or more to a nitriding temperature of the nitriding step. Namely, when the temperature increment rate is less than the lower limit of the range, it takes longer time to heat the aluminum powder to the nitriding temperature. Accordingly, the temperature increment rate can preferably be from 1 to 6° C./min.

In the nitrogen occluding step, the aluminum powder can preferably be held at a temperature of from 460° C. or more to 600° C. or less for a predetermined period of time. Namely, when the aluminum powder is held at a temperature of from 460° C. or more to 600° C. or less for a predetermined period of time, it is possible for the aluminum powder to occlude nitrogen in a sufficient amount.

In the nitrogen occluding step, the predetermined period of time can preferably be from 5 to 30 minutes. Namely, when the aluminum powder is held at the temperature for a predetermined period of from 5 to 30 minutes, it is possible for the aluminum powder to occlude nitrogen in a sufficient amount.

After a predetermined time passes in the nitrogen occluding step, the aluminum powder can preferably be heated at a temperature increment rate of 10° C./min. or more to a nitriding temperature of the nitriding step immediately. Consequently, the aluminum powder is inhibited from occluding nitrogen in an amount more than the occlusion. As a result, aluminum is suppressed from remaining in the resulting aluminum nitride, remaining which results from occluding nitrogen in an excessive amount.

In the nitriding step, the aluminum powder can preferably be put into an assembly state free from compression.

When the aluminum powder is put into an assembly state free from compression in the nitriding step, the aluminum powder can occlude nitrogen with ease in the nitrogen occluding step. Namely, when the aluminum powder is put into an assembly state free from compression, the respective aluminum particles can contact with a nitrogen gas with a large superficial area. Accordingly, the aluminum powder can occlude nitrogen sufficiently.

In the nitriding step, a pressure drop of the nitrogen gas pressure can preferably be 20 kPa or less in the developing nitriding reaction. Namely, when the pressure drop of the nitrogen gas is 20 kPa or less, aluminum is less likely to remain in the resulting aluminum nitride. On the other hand, when the pressure drop of the nitrogen gas exceeds 20 kPa, aluminum is likely to reside in the aluminum nitride being produced.

Specifically, in the nitriding step, when the nitriding reaction occurs in the aluminum powder with nitrogen occluded therein, the nitrogen of the nitrogen gas atmosphere and the occluded nitrogen make a nitrogen source, and thereby the aluminum powder forms aluminum nitride. Accordingly, the nitrogen content included in the nitrogen gas atmosphere is reduced to lower the nitrogen gas pressure. The fact implies that the larger the lowering magnitude of the nitrogen gas pressure in the developing nitriding reaction is the larger the consumption proportion of the nitrogen included in the nitrogen gas atmosphere is. If the consumption proportion of the nitrogen included in the nitrogen gas atmosphere increases, when the nitriding reaction occurs, specifically, when the nitriding reaction develops from the surface of the aluminum particles to the inside thereof, the developing rate of the nitriding reaction excels the supplying rate of nitrogen so that nitrogen is not supplied in an amount sufficient to form aluminum nitride. Consequently, aluminum nitride formed adjacent to the surface of the aluminum particles interferes with the intrusion of nitrogen. As a result, aluminum remains inside the aluminum particles.

The nitrogen gas atmosphere can preferably be maintained by a nitrogen gas, supplied from a nitrogen supplying apparatus which supplies a nitrogen gas continuously to a reactor chamber in which the aluminum powder is accommodated, and a nitrogen gas, discharged from a discharging apparatus which releases a nitrogen gas from the reactor chamber. Namely, it is possible to maintain the nitrogen gas pressure of the reactor chamber in which the aluminum powder is accommodated by a nitrogen gas, supplied from the nitrogen supplying apparatus, and a nitrogen gas, discharged from the discharging apparatus.

Specifically, in the nitriding step of the present aluminum nitride production process, the nitriding reaction of the aluminum powder develops rapidly. Accordingly, when the nitriding reaction is initiated, the nitrogen in the reaction chamber is consumed so that the nitrogen gas pressure drops sharply. Consequently, when the nitrogen gas pressure within the reactor chamber is maintained with the nitrogen supplying apparatus and the discharging apparatus, it is possible to inhibit the nitrogen gas pressure within the reactor chamber from varying.

Moreover, when the respective pressures of the nitrogen gas, supplied from the nitrogen supplying apparatus, and the nitrogen gas, discharged from the discharging apparatus are measured, it is possible to determine the nitrogen gas pressure within the reactor chamber. In addition, it is possible to calculate the nitrogen occlusion in the aluminum powder in the nitrogen occluding step, and to calculate the nitrogen gas drop in the developing nitriding reaction.

The reactor chamber can preferably comprise a secondary nitrogen supplying apparatus which supplies a nitrogen gas to the reactor chamber when the nitrogen gas pressure drops in the reactor chamber to a predetermined pressure or less. Namely, when the reactor chamber has the secondary nitrogen supplying apparatus, it is possible to inhibit the nitrogen gas pressure within the reactor chamber from varying. Specifically, in the nitriding step, when the nitriding reaction develops, the nitrogen gas pressure lowers sharply. However, when a nitrogen gas is supplied into the reactor chamber by using the secondary nitrogen supplying apparatus, it is possible to cope with minute variations of the nitrogen gas pressure within the reactor chamber.

More specifically, the nitriding reaction is a remarkable exothermic reaction, and generates heat in a quantity of 2,800 kcal (i.e., approx. $1.172 \times 10^4$ kJ) by nitriding 1 kg of aluminum theoretically. Moreover, in order to nitride 1 kg of aluminum, it is necessary to use a nitrogen gas in an amount of about 420 L. Accordingly, when the nitriding reaction is initiated, the nitrogen gas content and nitrogen gas pressure in the reactor chamber decrease sharply to result in nitrogen shortage. Consequently, when the reactor chamber has the secondary nitrogen supplying apparatus, it is possible to supply a nitrogen gas in a large amount into the reactor chamber.

Hence, the secondary nitrogen supplying apparatus can preferably supply a highly pressurized nitrogen gas into the reactor chamber.

In the present process for producing aluminum nitride, nitrogen is occluded in the aluminum powder in the nitrogen occluding step. Accordingly, nitrogen is held in the aluminum powder in such a sufficient amount that aluminum nitride is formed in the subsequent nitriding step. Thus, in the following nitriding step, it is possible to produce aluminum with a high yield without causing aluminum to remain in the resulting aluminum nitride. Moreover, in the present aluminum nitride production process, since it is possible to carry out nitriding the aluminum powder at a lower temperature, it is possible to produce an aluminum nitride powder whose particle diameters are small.

Aluminum Nitride

Aluminum nitride according to the present invention is subjected to the steps of occluding nitrogen having an average particle diameter of from 10 to 200 μm in an aluminum powder by holding the aluminum powder in a nitrogen gas atmosphere of 460° C. for 10 minutes or more; and nitriding the aluminum powder with nitrogen occluded therein by developing a nitriding reaction at a temperature of from 500 to 1,000° C. while holding the aluminum powder in a nitrogen atmosphere whose nitrogen gas pressure falls in a range of from 80 to 300 kpa. Namely, since the present aluminum nitride is subjected to the nitrogen occluding step and the nitriding step, it is aluminum nitride in which not-nitrided aluminum is inhibited from remaining.

The present aluminum nitride is produced in the following manner. Namely, when nitrogen is occluded in the aluminum powder in the nitrogen occluding step, nitrogen which causes reactions with the aluminum powder in the following nitriding step is disposed adjacent to the aluminum powder. Accordingly, even when rapid reactions occur in the nitriding step, it is possible to suppress nitrogen from being supplied insufficiently.

In the nitrogen occluding step, when the aluminum powder is held in a nitrogen gas atmosphere of 460° C. or more for 10 minutes or more, it is possible to occlude nitrogen in the aluminum powder. Note that, when the holding temperature is less than 460° C., or when the holding time is less than 10 minutes, nitrogen is occluded in the aluminum powder insufficiently.

Namely, in the direct nitriding method (i.e., $2Al + N_2 = 2AlN$) of an aluminum powder by a nitrogen gas, the free energy (i.e., the free energy of Gibbs) of the aluminum nitride formation is always negative. Accordingly, even when the holding temperature is less than 460° C., for example, it is thought that aluminum nitride is formed by holding an aluminum powder at the holding temperature for a long period of time. However, when it takes a long time to complete the reactions, the cost required for production goes up. Moreover, in the nitriding reaction, the higher the holding temperature is, the faster the reaction rate of the aluminum powder is. Consequently, from the industrial viewpoint, the holding temperature can preferably be a little bit higher, for instance, 500° C. or more. It is further preferred that the holding temperature can desirably be 550° C. or more.

The nitriding step is a step in which the aluminum powder with nitrogen occluded therein is nitrided by developing a nitriding reaction at a temperature of from 500 to 1,000° C. while holding the aluminum powder in a nitrogen atmosphere whose nitrogen gas pressure falls in a range of from 80 to 300 kPa. Namely, the nitriding step is a step in which the aluminum powder in which nitrogen is occluded in the nitrogen occluding step is held under the predetermined nitrogen gas pressure and at the predetermined heating temperature, thereby developing the nitriding reaction of aluminum. Note that the size of the primary particle diameter of ceramics is determined by the reaction initiation temperature in general. Accordingly, the primary particle diameters of the aluminum nitride particles to be produced are determined by the temperature at which the aluminum powder with nitrogen occluded therein is held in the nitriding step.

When the nitrogen gas pressure is controlled in the range of from 80 to 300 kPa in the nitriding step, a nitrogen gas is supplied to the aluminum powder in an amount sufficient for the nitriding reaction. Namely, when the nitrogen gas pressure is less than 80 kPa, air intrudes from the outside to oxidize the aluminum powder. On the other hand, when the nitrogen gas pressure exceeds 300 kPa, it is not possible to see the rise of the reaction yield in the nitriding reaction, and the cost required for production goes up.

Further, when the temperature of the nitriding reaction is less than 500° C., it takes a long time to carry out the nitriding reaction. When it exceeds 1,000° C., the particle diameters of the resulting aluminum nitride particles enlarge excessively.

Since the aluminum powder has an average particle diameter of from 10 to 200 μm, it is possible to produce aluminum nitride in which aluminum is inhibited from remaining. Namely, when the particle diameters of the aluminum powder enlarge, the nitrogen shortage occurs inside the aluminum particles in the nitriding reaction. Consequently, aluminum is likely to remain in the resulting aluminum nitride.

Furthermore, in the present aluminum nitride production process, the aluminum powder which is to be nitrided may have an oxide film on the surface. This is because, in air, aluminum has such a characteristic that it causes reactions with oxygen, included in the air, to form a stable oxide film on the surface.

Since the present aluminum nitride is subjected to the nitrogen occluding step and the nitriding step, it makes an aluminum nitride powder in which aluminum is inhibited from remaining and which has small particle diameters. Specifically, in the present aluminum nitride, the nitriding reaction is developed at a lower temperature, the particle diameters of the aluminum powder are kept from coarsening. In particular, the present aluminum nitride can preferably be a powder having an average particle diameter of 100 μm or less.

In the nitrogen occluding step, the aluminum powder can preferably be heated at a temperature increment rate of 10° C./min. or less from a temperature of 460° C. or more to a nitriding temperature of the nitriding step. Namely, in the nitrogen occluding step, when the aluminum powder is held at 460° C. at least for a time period of from 20 to 120 minutes until a nitrogen occlusion reaction is initiated, it is possible for the aluminum powder to occlude nitrogen in an amount sufficient for the nitriding reaction. When the time period is less than 20 minutes until a nitrogen occlusion reaction is initiated, the occlusion of nitrogen is less. Accordingly, it is not possible for the aluminum powder to react with a sufficient amount of nitrogen so that aluminum which is not nitrided remains in the resulting aluminum nitride. On the other hand, when the time period exceeds 120 minutes until a nitrogen occlusion reaction is initiated, the nitrogen occlusion in the aluminum powder is excessive so that it results in wasting the processing time.

In the nitrogen occluding step, the aluminum powder can preferably be heated at a temperature increment rate of 10° C./min. or less from a temperature of 460° C. or more to a nitriding temperature of the nitriding step. Namely, when the aluminum powder is heated at a temperature increment rate of 10° C./min. or less, it is possible for the aluminum powder to fully occlude nitrogen. On the other hand, when the temperature increment rate exceeds 10° C./min., the aluminum powder occludes nitrogen insufficiently so that aluminum remains in the resulting aluminum nitride.

In the nitrogen occluding step, the aluminum powder can preferably be heated at a temperature increment rate of from 1 to 6° C./min. from a temperature of 460° C. or more to a nitriding temperature of the nitriding step. Namely, when the temperature increment rate is less than the lower limit of the range, it takes longer time to heat the aluminum powder to the nitriding temperature. Accordingly, the temperature increment rate can preferably be from 1 to 6° C./min.

In the nitrogen occluding step, the aluminum powder can preferably be held at a temperature of from 460° C. or more to 600° C. or less for a predetermined period of time. Namely, when the aluminum powder is held at a temperature of from 460° C. or more to 600° C. or less for a predetermined period of time, it is possible for the aluminum powder to occlude nitrogen in a sufficient amount.

In the nitrogen occluding step, the predetermined period of time can preferably be from 5 to 30 minutes. Namely, when the aluminum powder is held at the temperature for a predetermined period of from 5 to 30 minutes, it is possible for the aluminum powder to occlude nitrogen in a sufficient amount.

After a predetermined time passes in the nitrogen occluding step, the aluminum powder can preferably be heated at a temperature increment rate of 10° C./min. or more to a nitriding temperature of the nitriding step immediately. Namely, when the aluminum powder is heated at a temperature increment rate of 10° C./min. or more, a nitrided film is formed on the surface of the aluminum powder in which nitrogen is occluded. Consequently, the aluminum powder is inhibited from occluding nitrogen in an amount more than the occlusion. As a result, aluminum is suppressed from remaining in the resulting aluminum nitride, remaining which results from occluding nitrogen in an excessive amount.

In the nitriding step, the aluminum powder can preferably be put into an assembly state free from compression.

When the aluminum powder is put into an assembly state free from compression in the nitriding step, the aluminum powder can occlude nitrogen with ease in the nitrogen occluding step. Namely, when the aluminum powder is put into an assembly state free from compression, the respective aluminum particles can contact with a nitrogen gas with a large superficial area. Accordingly, the aluminum powder can occlude nitrogen sufficiently.

In the nitriding step, a pressure drop of the nitrogen gas pressure can preferably be 20 kPa or less in the developing nitriding reaction. Namely, when the pressure drop of the nitrogen gas is 20 kPa or less, aluminum is less likely to remain in the resulting aluminum nitride. On the other hand, when the pressure drop of the nitrogen gas exceeds 20 kPa, aluminum is likely to reside in the aluminum nitride being produced.

Specifically, in the nitriding step, when the nitriding reaction occurs in the aluminum powder with nitrogen occluded therein, the nitrogen of the nitrogen gas atmosphere and the occluded nitrogen make a nitrogen source, and thereby the aluminum powder forms aluminum nitride. Accordingly, the nitrogen content included in the nitrogen gas atmosphere is reduced to lower the nitrogen gas pressure. The fact implies that the larger the lowering magnitude of the nitrogen gas pressure in the developing nitriding reaction is the larger the consumption proportion of the nitrogen included in the nitrogen gas atmosphere is. If the consumption proportion of the nitrogen included in the nitrogen gas atmosphere increases, when the nitriding reaction occurs, specifically, when the nitriding reaction develops from the surface of the aluminum particles to the inside thereof, the developing rate of the nitriding reaction excels the supplying rate of nitrogen so that nitrogen is not supplied in an amount sufficient to form aluminum nitride. Consequently, aluminum nitride formed adjacent to the surface of the aluminum particles interferes with the intrusion of nitrogen. As a result, aluminum remains inside the aluminum particles.

The nitrogen gas atmosphere can preferably be maintained by a nitrogen gas, supplied from a nitrogen supplying apparatus which supplies a nitrogen gas continuously to a reactor chamber in which the aluminum powder is accommodated, and a nitrogen gas, discharged from a discharging apparatus which releases a nitrogen gas from the reactor chamber. Namely, it is possible to maintain the nitrogen gas pressure of the reactor chamber in which the aluminum powder is accommodated by a nitrogen gas, supplied from the nitrogen supplying apparatus, and a nitrogen gas, discharged from the discharging apparatus.

Specifically, in the nitriding step of the present aluminum nitride production process, the nitriding reaction of the aluminum powder develops rapidly. Accordingly, when the nitriding reaction is initiated, the nitrogen in the reaction chamber is consumed so that the nitrogen gas pressure drops sharply. Consequently, when the nitrogen gas pressure within the reactor chamber is maintained with the nitrogen supplying apparatus and the discharging apparatus, it is possible to inhibit the nitrogen gas pressure within the reactor chamber from varying.

Moreover, when the respective pressures of the nitrogen gas, supplied from the nitrogen supplying apparatus, and the nitrogen gas, discharged from the discharging apparatus are measured, it is possible to determine the nitrogen gas pressure within the reactor chamber. In addition, it is possible to calculate the nitrogen occlusion in the aluminum powder in the nitrogen occluding step, and to calculate the nitrogen gas drop in the developing nitriding reaction.

The reactor chamber can preferably comprise a secondary nitrogen supplying apparatus which supplies a nitrogen gas to the reactor chamber when the nitrogen gas pressure drops in the reactor chamber to a predetermined pressure or less. Namely, when the reactor chamber has the secondary nitrogen supplying apparatus, it is possible to inhibit the nitrogen gas pressure within the reactor chamber from varying. Specifically, in the nitriding step, when the nitriding reaction develops, the nitrogen gas pressure lowers sharply. However, when a nitrogen gas is supplied into the reactor chamber by using the secondary nitrogen supplying apparatus, it is possible to cope with minute variations of the nitrogen gas pressure within the reactor chamber.

More specifically, the nitriding reaction is a remarkable exothermic reaction, and generates heat in a quantity of 2,800 kcal (i.e., approx. $1.172 \times 10^4$ kJ) by nitriding 1 kg of aluminum theoretically. Moreover, in order to nitride 1 kg of aluminum, it is necessary to use a nitrogen gas in an amount of about 420 L. Accordingly, when the nitriding reaction is initiated, the nitrogen gas content and nitrogen gas pressure in the reactor chamber decrease sharply to result in nitrogen shortage. Consequently, when the reactor chamber has the secondary nitrogen supplying apparatus, it is possible to supply a nitrogen gas in a large amount into the reactor chamber.

Hence, the secondary nitrogen supplying apparatus can preferably supply a highly pressurized nitrogen gas into the reactor chamber.

In the nitriding step, the reaction initiation temperature of the nitriding reaction can preferably be from 500 to 650° C. Namely, when the reaction initiation temperature of the nitriding reaction is from 500 to 650° C., the primary particle diameters of the resulting aluminum nitride particles become finer so that it is possible to produce an aluminum nitride powder whose primary particle diameters are fine. The present aluminum nitride can further preferably be a powder whose primary particle diameters are 5 μm or less.

Since the present aluminum nitride is subjected to the nitrogen occluding step and the nitriding step, it is free from remaining aluminum. Moreover, since the present aluminum nitride is nitrided at a lower temperature, it is possible to produce an aluminum nitride powder whose particle diameters are small.

EXAMPLES

The present invention will be hereinafter described with reference to specific examples.

A nitriding furnace, shown in FIG. 1, was prepared. As an example according to the present invention, an aluminum nitride powder was produced with the nitriding furnace by carrying out nitriding an aluminum powder.

Nitriding Furnace

As illustrated in FIG. 1, the nitriding furnace was an electric furnace which comprised a heat-resistant muffle 1 and was heated externally. The heat-resistant muffle 1 had an outside diameter of 165 mm, a thickness of 5 mm and an internal volume of 17 L, and its furnace wall was made of a stainless steel (e.g., SUS304 as per Japanese Industrial Standard). The nitriding furnace had an airtight construction which could maintain a vacuum of 0.1 kPa or less when it was evacuated by a vacuum pump 15.

Further, into the nitriding furnace, a first nitrogen supplying apparatus 2 and a second nitrogen supplying apparatus 3 could supply a nitrogen gas, respectively. The first nitrogen supplying apparatus 2 and the second nitrogen supplying apparatus 3 were arranged so that they could supply nitrogen in a predetermined amount, respectively, into the heat-resistant muffle 1. specifically, the first nitrogen supplying apparatus 2 had a first gas bomb 21, a first tubular passage 22 and a first valve 23. The first gas bomb 21 accommodated a nitrogen gas whose purity was 99.9% or more therein. The first tubular passage 22 was connected with the first nitrogen bomb 21 at one of the opposite ends, and was opened at the other one of the opposite ends to face the furnace wall in the heat-resistant muffle 1. The first valve 23 was disposed in the middle of the first tubular passage 22 so as to regulate a flow rate of the nitrogen gas which passed inside the first tubular passage 22. The second nitrogen supplying apparatus 3 had a second gas bomb 31, a second tubular passage 32 and a second valve 33. The second gas bomb 31 accommodated a nitrogen gas whose purity was 99.9% or more therein. The second tubular passage 32 was connected with the second nitrogen bomb 31 at one of the opposite ends, and was opened at the other one of the opposite ends to face the furnace wall in the heat-resistant muffle 1. The second valve 33 was disposed in the middle of the second tubular passage 32 so as to regulate a flow rate of the nitrogen gas which passed inside the second tubular passage 32. Note that the two tubular passages, the first tubular passage 22 and the second tubular passage 32, were united integrally in the heat-resistant muffle 1 so that they shared the other one of their opposite openings with each other.

The first nitrogen supplying apparatus 2 was equipped with a mass flowmeter 24 which measures the flow rate of the nitrogen gas passing inside the first tubular passage 22. The mass flowmeter 24 was disposed in the middle of the first tubular passage 22, and was made by YAMATAKE Co., Ltd. By the mass flowmeter 24, it was possible to appropriately select the flow rate of the nitrogen gas in a range of from 2 to 50 L/min.

The second nitrogen gas supplying apparatus 3 kept a release pressure of the second nitrogen bomb 31 at 400 kPa. It supplied the nitrogen gas into the heat-resistant muffle 1 by opening the second valve 33.

Furthermore, the nitriding furnace comprised a discharging apparatus 4 which discharged nitrogen within the heat-resistant muffle 1. The discharging apparatus 4 had a tubular passage 41 and a discharging valve 42. The tubular passage 41 was opened inside the heat-resistant muffle 1 at one of the opposite ends, and was opened outside the heat-resistant muffle 1 at the other one of the opposite ends. The discharging valve 42 was disposed in the middle of the tubular passage 41, and regulated a flow rate of a nitrogen gas which passed in the tubular passage 41.

Moreover, the nitriding furnace comprised a pressure gauge 51 and a thermometer 52. The pressure gauge 51 measured a pressure within the heat-resistant muffle 1 in a range of from 0 to 200 kPa, had four contacts, and was made by CKD Co., Ltd. The thermometer 52 measured a temperature within the heat-resistant muffle 1.

In addition, the pressure gauge 51, the thermometer 52, the first valve 23, the second valve 33 and the discharging valve 42 were connected electrically with a computing apparatus 55. The computing apparatus 55 computed environments within the beat-resistant muffle 1 by using data which were measured by the pressure gauge 51 and the thermometer 52, determined the opening magnitudes of the first valve 23, the second valve 33 and the discharging valve 42, respectively, by using deviations from desirable setting conditions. Simultaneously, the computing apparatus 55 could open and close the first valve 23, the second valve 33 and the discharging valve 42, respectively. Moreover, the computing apparatus 55 could display measured data on a monitor of a not-shown output apparatus.

Example No. 1

As Example No. 1, a high-purity aluminum powder was nitrided by using the nitriding furnace illustrated in FIG. 1. The high-purity aluminum powder was produced by TOYO ALUMINUM Co., Ltd., and had an average particle diameter of 10 µm and a purity of 99.7%.

Sample No. 1

The nitriding of the high-purity aluminum powder was carried out in the following manner. First, 250 g of the raw high-purity aluminum powder and 250 g of a homemade aluminum nitride powder were fully mixed by a hand mixer. The homemade aluminum nitride powder had a mesh size of 100 or less. Subsequently, the resulting raw mixture powder was accommodated in a sample box 17 whose internal volume was 1,800 cc. The sample box 17 was equipped with a thermocouple, had a vessel shape whose top surface was opened, and was made of a stainless steel. The sample box 17 was disposed at the center of the heat-resistant muffle 1. Note that the raw mixture powder was not compressed when it was accommodated in the sample box 17.

Thereafter, the first valve 23 of the first nitrogen supplying apparatus 2 and the discharging valve 42 of the discharging apparatus 4 were opened so as to make a nitrogen gas atmosphere within the heat-resistant muffle 1. Accordingly, the dew point within the heat-resistant muffle 1 was −50° C. or less when the temperature was raised to 450° C. The observation of the dew point was carried out by using a dew-point meter 45 which was disposed in the middle of the tubular passage 41 of the discharging apparatus 4.

Note that the homemade aluminum nitride powder was produced by using one of the prior arts, the method in which an aluminum powder was heated in a nitrogen atmosphere to cause a nitriding reaction.

Subsequently, a nitrogen gas was supplied from the first nitrogen supplying apparatus 2 into the heat-resistant muffle 1 at a flow rate of 10 L/min. Simultaneously, the pressure within the heat-resistant muffle 1 was controlled at 140.0 kPa by regulating the discharging valve 42 of the discharging apparatus 4. Note that Table 1 below sets forth the composition of the raw mixture powder and the nitrogen-occlusion setting conditions of the environment within the heat-resistant muffle 1 of the nitriding furnace.

TABLE 1

| | Raw Materials | | Nitrogen-Occlusion Setting Conditions | | |
| --- | --- | --- | --- | --- | --- |
| | | | Temp. | Pressure | Nitrogen |
| Sample No. | Al Powder Amount (g) | AlN Powder Amount (g) | Increment Rate (°C./min) | Within Furnace (kPa) | Gas Flow Rate (L/min.) |
| 1 | 250 | 250 | 2 | 140.0 | 10 |
| 2 | 300 | 270 | 5 | 140.0 | 10 |
| 3 | 300 | 150 | 1.6 | 140.0 | 10 |
| 4 | 100 | 100 | 15 | 140.0 | 9.4 |
| 5 | 100 | 100 | 15 | 140.0 | 9.4 |

While regulating the nitrogen gas pressure within the heat-resistant muffle 1, the temperature within the heat-resistant muffle 1 was increased to 500° C. by turning on electricity to a heater 11 for heating the heat-resistant muffle 1. In this instance, the temperature increment rate was 5° C./min. Thereafter, the temperature was increased to 600° C., which was a setting temperature for the nitriding reaction, over a time period of 50 minutes. In this instance, the temperature increment rate was 2° C./min. When the temperature within the heat-resistant muffle 1 reached 600° C., the temperature was kept thereat. When the temperature within the heat-resistant furnace 1 was kept at 600° C., the nitriding reaction was initiated after 38 minutes passed. Then, the nitriding reaction completed in 7 minutes. Thus, an aluminum nitride powder of Sample No. 1 was produced. Note that, since the nitriding reaction developed at a remarkable reaction rate, the second nitrogen supplying apparatus 3 was actuated to maintain the pressure within the heat-resistant muffle 1 at the setting pressure. Moreover, note that the time required for the nitriding reaction was the time period over which the second valve 33 of the second nitrogen supplying apparatus 3 was opened.

While heating the raw mixture powder, the temperature within the heat-resistant muffle 1 was kept at 600° C. Until the nitriding reaction was initiated, the pressure gauge 51 observed a nitrogen gas pressure drop within the heat-resistant muffle 1. As a result, the nitrogen gas pressure drop within the heat-resistant muffle 1 was 5.45 kPa. The nitrogen gas pressure drop within the heat-resistant muffle 1 resulted from the fact that the aluminum powder occluded the nitrogen gas therein.

Thereafter, the sample box 17 was cooled. When an aluminum nitride powder was recovered from the sample box 17, it was collected in an amount of 629 g.

When the aluminum nitride powder of Sample No. 1 was analyzed, it was found that the nitrogen content was 34.0% by weight, the oxygen content was 0.340% by weight and the remaining aluminum content was 242 ppm by weight. Thus, it was understood that the thus produced aluminum nitride powder had a nitriding yield of 100% substantially. Here, Table 2 below summarizes the setting conditions for the nitriding reaction and the results of the analysis.

g. Table 2 summarizes the setting conditions for the nitriding reaction and the results of the analysis in Sample No. 2 along with those in Sample No. 1.

According to the results of the analysis on the aluminum nitride powder of Sample No. 2, it was found that the nitrogen content was 34.1% by weight, the oxygen content was 0.73% by weight and the remaining aluminum content was 190 ppm by weight. Thus, the nitrogen content was as high as 34.1% by weight. It was understood that the aluminum nitride powder of Sample No. 2 had a nitriding yield of 100% substantially.

TABLE 2

| | Nitriding-Reaction Setting Conditions | | | | Results of Analysis | | | | |
|---|---|---|---|---|---|---|---|---|---|
| | | | | | Formed | Nitrogen | Oxygen | Remaining | Average |
| Sample No. | Reaction Temp. (° C.) | Holding Time (min.) | Pressure Drop (kPa) | Reaction Time (min.) | AlN Amount (g) | Content (% by Weight) | Content (% by Weight) | Al Content (ppm by Weight) | Particle Diameter (μm) |
| 1 | 600 | 38 | 5.3 | 7 | 629 | 34.0 | 0.34 | 241 | 0.5–2 |
| 2 | 635 | 27 | 18.6 | 5 | 723 | 34.1 | 0.73 | 190 | Not Measured |
| 3 | 570 | 45 | 1.3 | 4 | 594 | 33.2 | Not Measured | Not Measured | Not Measured |
| 4 | 850 | 8 | 3.7 | 2.5 | 252 | 33.9 | 0.41 | 321 | Not Measured |
| 5 | 940 | 19 | 3.5 | 2.5 | 253 | 34.1 | 0.38 | 360 | Not Measured |

Figure 2A:
FIG. 2 is SEM (i.e. scanning electron microscope) photographs on Sample No. 1 of Example No. 1 according to the present invention.
Figure 2B:

Moreover, the aluminum nitride powder of Sample No. 1 was photographed with an SEM, and FIG. 2 shows the resulting SEM photographs. Note that FIG. 2(*a*) is an SEM photograph whose magnification was 2,000 times, and that FIG. 2(*b*) is an SEM photograph whose magnification was 5,000 times.

From FIG. 2, it was confirmed that the aluminum nitride powder of Sample No. 1 had particle diameters which fell in a range of from 0.5 to 2 μm. Thus, it was understood that the aluminum nitride powder of Sample No. 1 made a fine powder which had been difficult to produce by the conventional production processes for producing aluminum nitride. Note that, in FIG. 2(*a*), large particles are appreciated. The large particles were secondary particles in which primary particles were agglomerated. It is possible to make the secondary particles into a fine aluminum nitride powder with ease by carrying out pulverizing.

Sample No. 2

Except that 300 g of the raw aluminum powder and 270 g of the homemade aluminum nitride powder were used, the nitriding-reaction setting reaction temperature was 635° C. and the temperature increment rate was 5° C./min., an aluminum nitride powder of Sample No. 2 was produced in the same manner as Sample No. 1. Here, Table 1 sets forth the nitrogen-occlusion setting conditions in the production of the aluminum nitride powder of Sample No. 2 together with those in the production of Sample No. 1.

In the production of the aluminum nitride powder of Sample No. 2, the raw mixture powder was held at the nitriding-reaction setting temperature for 27 minutes. The nitrogen gas pressure drop within the heat-resistant muffle 1 was 18.6 kPa until the nitriding reaction was initiated. The time required for the nitriding reaction was 5 minutes. The aluminum nitride powder was formed in an amount of 723

Sample No. 3

Except that 300 g of the raw aluminum powder and 150 g of the homemade aluminum nitride powder were used, the nitriding-reaction setting reaction temperature was 570° C. and the temperature increment rate was 1.6° C./min., an aluminum nitride powder of Sample No. 3 was produced in the same manner as Sample No. 1. Here, Table 1 sets forth the nitriding-occlusion setting conditions in the production of the aluminum nitride powder of Sample No. 3 together with those in the production of Sample No. 1 and so on.

In the production of the aluminum nitride powder of Sample No. 3, the raw mixture powder was held at the nitriding-reaction setting temperature for 45 minutes in the nitriding reaction. The nitrogen gas pressure drop within the heat-resistant muffle 1 was 2.3 kPa until the nitriding reaction was initiated. The time required for the nitriding reaction was 4 minutes. The aluminum nitride powder was formed in an amount of 594 g. Table 2 summarizes the setting conditions for the nitriding reaction and the results of the analysis in Sample No. 3 along with those in Sample No. 1 and so forth.

According to the results of the analysis on the aluminum nitride powder of Sample No. 3, it was shown that the aluminum nitride powder of Sample No. 3 had the nitrogen content as low as 33.2% by weight. Since the nitrogen gas drop within the heat-resistant muffle 1 was less, and since the abrupt nitriding reaction lasted only for a short period of time, the surface of the aluminum powder was covered with the black nitrided film in the middle of the nitriding reaction. Accordingly, it was judged that the nitriding reaction was inhibited from developing.

Example No. 2

In Example No. 2, the nitriding furnace illustrated in FIG. 1 was used. After the raw mixture powder was held at a nitrogen-occlusion temperature, 535° C., for a predetermined period of time, the temperature was raised immediately to nitriding-reaction setting temperatures to develop the nitriding reaction.

Sample No. 4

100 g of a high-purity aluminum powder and 100 g of a homemade aluminum nitride powder were fully mixed. The high-purity aluminum powder was produced by TOYO ALUMINUM Co., Ltd., and had an average particle diameter of 75 µm and a purity of 99.7%. The raw mixture powder was accommodated in the sample box 17 which was used in the production of the aluminum nitride powder of Example No. 1. Then, the sample box 17 was disposed inside the heat-resistant muffle 1.

Thereafter, the pressure within the heat-resistant muffle 1 was set at 140.0 KPa, the first nitrogen gas supplying apparatus 2 was controlled to supply a nitrogen gas at a flow rate of 8.4 L/min. The temperature within the heat-resistant muffle 1 was first set at 220° C., and was then increased to 535° C. The environment within the heat-resistant muffle I was maintained for 20 minutes. Note that the temperature within the heat-resistant muffle 1 was increased from 220° C. to 535° C. over a time period of 1 hour. In this instance, the temperature increment rate was 5.3° C./min. approximately.

The raw mixture powder, being held at 535° C. for 20 minutes, was heated immediately to the nitriding-reaction setting temperature, 850° C., at a temperature increment rate of 15° C./min. The nitriding reaction was developed at 850° C. The resulting aluminum nitride powder was labeled Sample No. 4. Here, Table 1 sets forth the nitrogen-occlusion setting conditions in the production of the aluminum nitride powder of Sample No. 4 together with those in the production of Sample No. 1 and so on.

In the production of the aluminum nitride powder of Sample No. 4, the raw mixture powder was held at the nitriding-reaction setting temperature for 45 minutes. The nitrogen gas pressure drop within the heat-resistant muffle 1 was 3.7 kPa until the nitriding reaction was initiated. The time required for the nitriding reaction was 2.54 minutes. The aluminum nitride powder was formed in an amount of 252 g. Table 2 summarizes the setting conditions for the nitriding reaction and the results of the analysis in sample No. 4 along with those in Sample No. 1 and so forth.

According to the results of the analysis on the aluminum nitride powder of Sample No. 4, it was found that the nitrogen content was 33.9% by weight, the oxygen content was 0.41% by weight and the remaining aluminum content was 321 ppm by weight. Since the temperature was increased from the holding temperature in the nitrogen occluding step to the setting temperature in the nitriding step at such a high temperature increment rate of 15° C./min., the aluminum powder was inhibited from occluding nitrogen in an excessive amount. As a result, it was believed that the aluminum nitride powder of Sample No. 4 exhibited such a low remaining aluminum content.

Moreover, when the aluminum nitride powder of Sample No. 4 was observed with a microscope, it was appreciated that a large number of white whiskers were present in the aluminum nitride powder of Sample No. 4.

Sample No. 5

Except that another raw aluminum powder was used, the nitriding-reaction setting temperature was 940° C., and the raw mixture powder was held at 940° C. for 19 minutes, an aluminum nitride powder of Sample No. 5 was produced in the same manner as Sample No. 4. The other raw aluminum powder was produced by TOYO ALUMINUM Co., Ltd., and had an average particle diameter of 200 µm and a purity of 99.6%. Table 1 sets forth the nitrogen-occlusion setting conditions in the production of the aluminum nitride powder of Sample No. 5 together with those in the production of Sample No. 1 and so on.

According to the results of the analysis on the aluminum nitride powder of Sample No. 5, it was found that the nitrogen content was 34.1% by weight, the oxygen content was 0.36% by weight and the remaining aluminum content was 360 ppm by weight. Since the temperature was increased from the holding temperature in the nitrogen occluding step to the setting temperature in the nitriding step at such a high temperature increment rate of 15° C./min., the aluminum powder was inhibited from occluding nitrogen in an excessive amount. As a result, it was believed that the aluminum nitride powder of Sample No. 5 exhibited ouch a low remaining aluminum content.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing aluminum nitride comprising the steps of:
   holding a material consisting essentially of an aluminum powder having an average particle diameter of from 10 to 75 µm in a nitrogen gas atmosphere at a temperature of from 460° C. or more to less than 600° C. for 5 minutes or more so as to occlude nitrogen in the aluminum powder; and
   nitriding the aluminum powder with nitrogen occluded therein by developing a nitriding reaction at a temperature of from 500 to 650 ° C. while holding the aluminum powder in a nitrogen atmosphere whose nitrogen gas pressure falls in a range of from 80 to 300 kPa,
   wherein the aluminum powder has a purity of 99.7% or more.

2. The process for producing aluminum nitride set forth in claim 1, wherein said aluminum powder is held at 460° C. at least for a time period of from 20 to 120 minutes until a nitrogen occlusion reaction is initiated in said nitrogen occluding step.

3. The process for producing aluminum nitride set forth in claim 1, wherein said aluminum powder is heated at a temperature increment rate of 10° C./min. or less from a temperature of 460° C. or more to a nitriding temperature of said nitriding step in said nitrogen occluding step.

4. The process for producing aluminum nitride set forth in claim 1, wherein said aluminum powder is heated at a temperature increment rate of from 1 to 6° C./min. from a temperature of 460° C. or more to a nitriding temperature of said nitriding step in said nitrogen occluding step.

5. The process for producing aluminum nitride set forth in claim 1, wherein said predetermined period of time is from 5 to 30 minutes in said nitrogen occluding step.

6. The process for producing aluminum nitride set forth in claim 1, wherein said aluminum powder is heated at a temperature increment rate of 10° C./min. or more to a nitriding temperature of said nitriding step immediately after a predetermined time passes in said nitrogen occluding step.

7. The process for producing aluminum nitride set forth in claim 1, wherein said aluminum powder is put into an assembly state free from compression in said nitriding step.

8. The process for producing aluminum nitride set forth in claim 1, wherein a pressure drop of said nitrogen gas pressure is 20 kPa or less in the developing nitriding reaction in said nitriding step.

9. The process for producing aluminum nitride set forth in claim 1, wherein said nitrogen gas atmosphere is maintained by a nitrogen gas, supplied from a nitrogen supplying apparatus which supplies a nitrogen gas continuously to a reactor chamber in which said aluminum powder is accommodated, and a nitrogen gas, discharged from a discharging apparatus which releases a nitrogen gas from the reactor chamber.

10. The process for producing aluminum nitride set forth in claim 9, wherein a nitrogen gas is supplied to the reactor chamber from a secondary nitrogen supplying apparatus when the nitrogen gas pressure drops in the reactor chamber to a predetermined pressure or less.

* * * * *